(12) United States Patent
Miller et al.

(10) Patent No.: US 8,719,923 B1
(45) Date of Patent: May 6, 2014

(54) METHOD AND SYSTEM FOR MANAGING SECURITY OPERATIONS OF A STORAGE SERVER USING AN AUTHENTICATED STORAGE MODULE

(75) Inventors: Steven C. Miller, Sunnyvale, CA (US); Ravi Kavuri, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 653 days.

(21) Appl. No.: 12/701,457

(22) Filed: Feb. 5, 2010

(51) Int. Cl.
*G06F 21/00* (2013.01)
*G06F 21/34* (2013.01)
*G06F 21/60* (2013.01)
*G06F 21/62* (2013.01)

(52) U.S. Cl.
CPC .............. *G06F 21/34* (2013.01); *G06F 21/602* (2013.01); *G06F 21/62* (2013.01); *G06F 21/608* (2013.01)
USPC ................. 726/20; 713/172; 713/185; 726/30

(58) Field of Classification Search
CPC . H04L 63/0853; H04L 9/3234; H04L 9/0897; G06F 21/63; G06F 21/602; G06F 21/62; G06F 21/608
USPC ........ 380/277; 726/9, 8, 27–30; 713/172, 185
See application file for complete search history.

(56) References Cited

U.S. PATENT DOCUMENTS

| | | | | |
|---|---|---|---|---|
| 6,307,936 | B1* | 10/2001 | Ober et al. ...................... | 380/30 |
| 6,839,437 | B1* | 1/2005 | Crane et al. .................... | 380/286 |
| 7,783,882 | B2* | 8/2010 | Dawson et al. ................ | 713/165 |
| 7,805,611 | B1* | 9/2010 | Montemayor et al. ........ | 713/172 |
| 8,005,227 | B1* | 8/2011 | Linnell et al. ................. | 380/279 |
| 2006/0059348 | A1* | 3/2006 | Girard et al. .................. | 713/176 |
| 2008/0189543 | A1* | 8/2008 | Parkinson ...................... | 713/156 |
| 2008/0219449 | A1* | 9/2008 | Ball et al. ...................... | 380/277 |
| 2010/0049735 | A1* | 2/2010 | Hsu ........................... | 707/103 R |

* cited by examiner

*Primary Examiner* — Jung Kim
*Assistant Examiner* — Carlos M De Jesus Lassala
(74) *Attorney, Agent, or Firm* — DeLizio Gilliam, PLLC

(57) ABSTRACT

The present invention provides a technique, in a network storage system, for a key management module (KMM) managing security operations within the storage server using an authenticated storage module (ASM) such as a smart card of the storage server. The KMM may process encryption key information (key information) generated by an encryption engine of the storage server to associate a key with a storage object of the storage server. The processed key information may then be stored by the KMM to a key map of the ASM, for which the ASM performs security services prior to storing information to the key map. The KMM may then request key information stored in the key map from the ASM, and forward the key information to the encryption engine for performing cryptographic operations on data of the storage object.

21 Claims, 11 Drawing Sheets

KEY MAP
500

OBJECT_ID  510
KEY_ID  520
PASSPHRASE_ID  530
...  540

FIG. 5

METHOD AND SYSTEM FOR MANAGING SECURITY OPERATIONS OF A STORAGE SERVER USING AN AUTHENTICATED STORAGE MODULE

FIELD OF THE INVENTION

The present invention relates to storage systems, and more particularly to a key management module managing security operations within the storage server using an authenticated storage module of the storage server.

BACKGROUND

A storage server is a computer that provides access to information (data) that is stored on one or more storage devices connected to the storage server, such as disk drives ("disks"), flash devices, or storage arrays. Each storage device may constitute a physical storage object of the storage server on which information is stored. The storage server also includes an operating system that may implement a storage abstraction layer to logically organize the information as logical storage objects on the physical storage objects (e.g., disks). With certain logical organizations, the storage abstraction layer may involve a file system which organizes information as a hierarchical structure of directories and data containers, such as files. Each file may be implemented as set of data structures, e.g., disk blocks, configured to store information, such as the actual data for the file. The file system typically organizes such data blocks as a "logical volume" whereby each directory, file, and logical volume may constitute a logical storage object. With certain logical organizations, a file system may also constitute a logical storage object.

A storage server may be configured to operate according to a client/server model of information delivery to allow one or more clients access to data in logical storage objects (e.g., logical volumes) stored on the storage server. In this model, the client may comprise an application executing on a computer that "connects" to the storage server over a computer network, such as a point-to-point link, shared local area network, wide area network or virtual private network implemented over a public network, such as the Internet. A client may access the logical volumes by submitting access requests to the storage server, for example, a "write" request to store client data included in a request to disk or a "read" request to retrieve client data from disk.

Multiple storage servers may be networked or otherwise connected together as a storage system whereby data are securely stored by the storage servers to protect against possible unauthorized access to such data. To that end, data may be secured by a storage server transforming unencrypted data (cleartext) into encrypted data (ciphertext) destined for storage on the storage system. The transformation may be performed using an encryption key (also referred to as a key) which is a code or number that, when taken together with an encryption algorithm, defines a unique transformation used to encrypt or decrypt data. Storage containing encrypted data may thus be referred to as "secure storage" since data is not stored in its native form but rather in encrypted form. Secure storage may be implemented by encrypting data prior to being written to storage and decrypting data upon being read from storage.

To provide further security against unauthorized access, each of the storage objects constituting secure storage (e.g., logical volumes, disks) may be associated with its own encryption key for securing data of the storage object. As a result, logical access to data of the storage objects may be limited in the event one of the keys is subject to unauthorized access. An encryption key may also be associated with yet another encryption key, referred to as a "passphrase," which may be used to encrypt or decrypt the encryption key for added security when the encryption key itself is being stored. In order to track the associations (mappings) between the various keys and storage objects, a technique for managing key information may be implemented to coordinate the use of the keys with data of the storage objects or with other encrypted keys.

With conventional storage systems, security operations involving cryptographic and key management tasks may be performed by, and coordinated between, dedicated processing systems networked or otherwise connected to the storage server. This configuration avoids the need for critical security operations to compete for resources of a single processing system when securing data of the storage server. One such exemplary configuration may involve a storage server connected to a cryptographic processing system such as a DataFort™ appliance offered by NetApp, Inc., of Sunnyvale, Calif., which receives cleartext and encrypted data from the storage server and returns encrypted and cleartext data to the storage server. In contrast, a key manager such as a Lifetime Key Management™ appliance also offered by NetApp, Inc., may be operative to store the keys and respond to key requests from the cryptographic processing system.

A primary concern with the conventional configuration involves, however, the overhead associated with providing and managing the various processing systems to secure data of the storage server. Establishing a secure connection to avoid unintended exposure of information across the network or connection port between the dedicated processing systems may also require special expertise or skills by an administrator of the storage server. For instance, a secure connection may typically be achieved by carrying out a complex exchange of information between the various systems to ensure an authorized user is interfacing with each of the systems. In addition, it may be cumbersome to access the dedicated and possibly remote system each time a cryptographic operation is performed or key information is otherwise requested by the storage server. This may involve tying up limited system resources such as network bandwidth and slowing down storage system performance to delay servicing of access requests from a client.

Finally, in certain cases, the administrator may need to implement additional security measures to further ensure the security of data stored by the storage server. When security measures are carried out by a system configuration involving separate processing systems, the administrator must manually invoke the operations at the various systems which may be a burdensome task on the part of the administrator. Manual invocation of such tasks may further involve delay in implementing potentially critical security measures.

SUMMARY

Embodiments of the present invention provide a technique, in a network storage system, for a key management module (KMM) managing security operations within the storage server using an authenticated storage module (ASM) implemented as a smart card, for example, of the storage server. The KMM may process encryption key information (key information) generated by an encryption engine of the storage server to associate a key with a storage object of the storage server. The processed key information may then be stored by the KMM to a data structure such as a key map of the ASM, for which the ASM performs security services prior to storing information to the key map. The KMM may then request key information stored in the key map from the ASM, and forward the key information to the encryption engine for performing cryptographic operations on data of the storage object.

Advantageously, the KMM may be operative to further secure data of the storage server by invoking a security operation based on a state of the ASM. The administrator may request the security operation by engaging a switch disposed on the external housing of the storage server. The security operation may, for instance, involve a shredding operation which overwrites data of the storage object or generates a new key for the storage object. A state of the ASM may include a "connected" state, for instance, constituting successful authentication of identities of the storage server and administrator. Based on successful authentication, the KMM may retrieve key information from the ASM for use in invoking the security operation on the storage object.

In accordance with the novel techniques of the present invention, data stored by the storage server may be secure while avoiding the need for an administrator to maintain and manage separate processing systems in support of secure storage. Rather, execution of security operations within the storage server may be coordinated by the KMM between the encryption engine and ASM to provide dedicated storage locations and processing resources for carrying out various security-related tasks. Additional measures for securing data may also be promptly carried out by the KMM based on a state of the ASM to avoid the unwieldy manual coordination of tasks between various processing systems otherwise apparent with conventional system configurations.

Additional aspects of the invention will become apparent from the following detailed description taken in conjunction with the accompanying drawings, which illustrate the principles of the invention by way of example.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 5 illustrates an illustrative key map data structure implemented by the ASM for storing key information processed by the KMM in one embodiment;

DETAILED DESCRIPTION

A method and system for a key management module (KMM) managing security operations within the storage server using an authenticated storage module (ASM) of the storage server is provided herein. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

System Overview

Figure 1A:
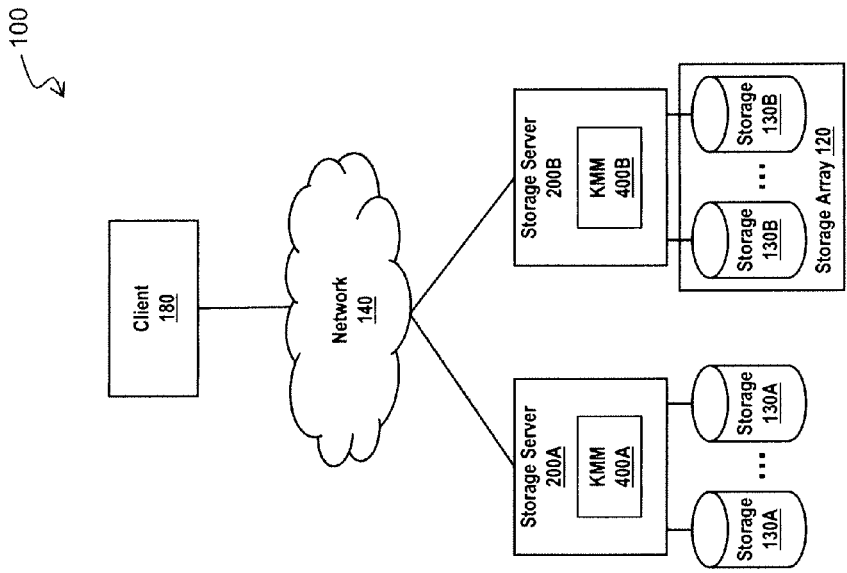
FIG. 1A illustrates a network storage system in which the present invention may be implemented.

FIG. 1A shows a network storage system 100 in which the present invention may be advantageously implemented in one embodiment. Storage servers 200 (storage servers 200A, 200B) manage multiple storage units 130 which include mass storage devices such as flash memories, disks, tapes, or other similar media adapted to store information. The mass storage devices may further constitute a storage array 120 and be organized as a Redundant Array of Inexpensive Disks/Devices (RAID), whereby storage servers 200 access storage units 130 using one or more RAID protocols known in the art for recovering from a failure of one or more of the mass storage devices.

Storage servers 200 provide storage services to one or more clients 180 through a network 140 by receiving and responding to various read and write requests from client 180 directed to storage units 130. Network 140 may be, for example, a local area network (LAN), wide area network (WAN), metropolitan area network (MAN), global area network such as the Internet, a Fibre Channel fabric, or any combination of such interconnects. Client 180 may be, for example, a conventional personal computer (PC), server-class computer, workstation, handheld computing or communication device, or other special or general purpose computer.

In addition, storage servers 200 may each provide a file-level service such as used in a network-attached storage (NAS) environment, a block-level service such as used in a storage area network (SAN) environment, a service which is capable of providing both file-level and block-level service, or any other data access service capable of providing access to information stored on storage units 130. Although storage servers 200 are each illustrated as single units in FIG. 1A, a storage server can, in other embodiments, be implemented as one or more physically separate network modules (an "N-module") and data modules (a "D-module"). To that end, each D-module may include storage access components for accessing data on storage units 130, whereas each N-Module includes functionality for providing client 180 access to components of the D-module. An exemplary distributed or clustered storage system architecture is described further with respect to FIG. 1B. Moreover, certain embodiments of system 100 may include more than two storage servers so it will be appreciated that the invention is not so limited to the description provided herein.

In some embodiments, each of storage servers 200 may be referred to as a network storage subsystem. A network storage subsystem may provide networked storage services for a specific application or purpose. Examples of such applications include database applications, web applications, Enterprise Resource Planning (ERP) applications, etc. Examples of such purposes include file archiving, backup, mirroring, etc. A network storage subsystem can also be implemented with a collection of networked resources provided across multiple storage servers and/or storage units.

Illustratively, storage units 130 implement secure storage by storing data in encrypted form. In one embodiment, secure storage may involve encrypting data stored on physical storage objects implemented by the mass storage devices (e.g., disks) constituting storage units 130. To that end, each disk may be associated with a different encryption key and, in certain cases a key may further be associated with a passphrase for secure storage of the key (i.e. storing the key in encrypted form). Key information, including an encryption key and corresponding unique key identifier (key ID), may be generated by an encryption engine of the storage server during initialization of each disk, for instance.

In general, novel key management modules (KMM) 400 (KMM 400A, 400B) may coordinate the overall security operations of storage servers 200 by processing the key information generated by the encryption engine to associate a key with a disk of the storage server. KMM 400 may generate the association using a data structure such as a key entry described in further detail with reference to FIG. 4. The processed key information may then be stored by KMM 400 to an authenticated storage module (ASM) of the storage server, which performs security services prior to storing the processed key information as requested by KMM 400. The ASM, discussed in detail with reference to FIG. 2A, 2B, may then be accessed by KMM 400 to retrieve key information from the ASM when a cryptographic operation is performed on data of the disk. Advantageously, an additional security operation may also be invoked by KMM 400 to further secure data stored on the disk based on a state of the ASM.

Clustered Storage System

Figure 1B:
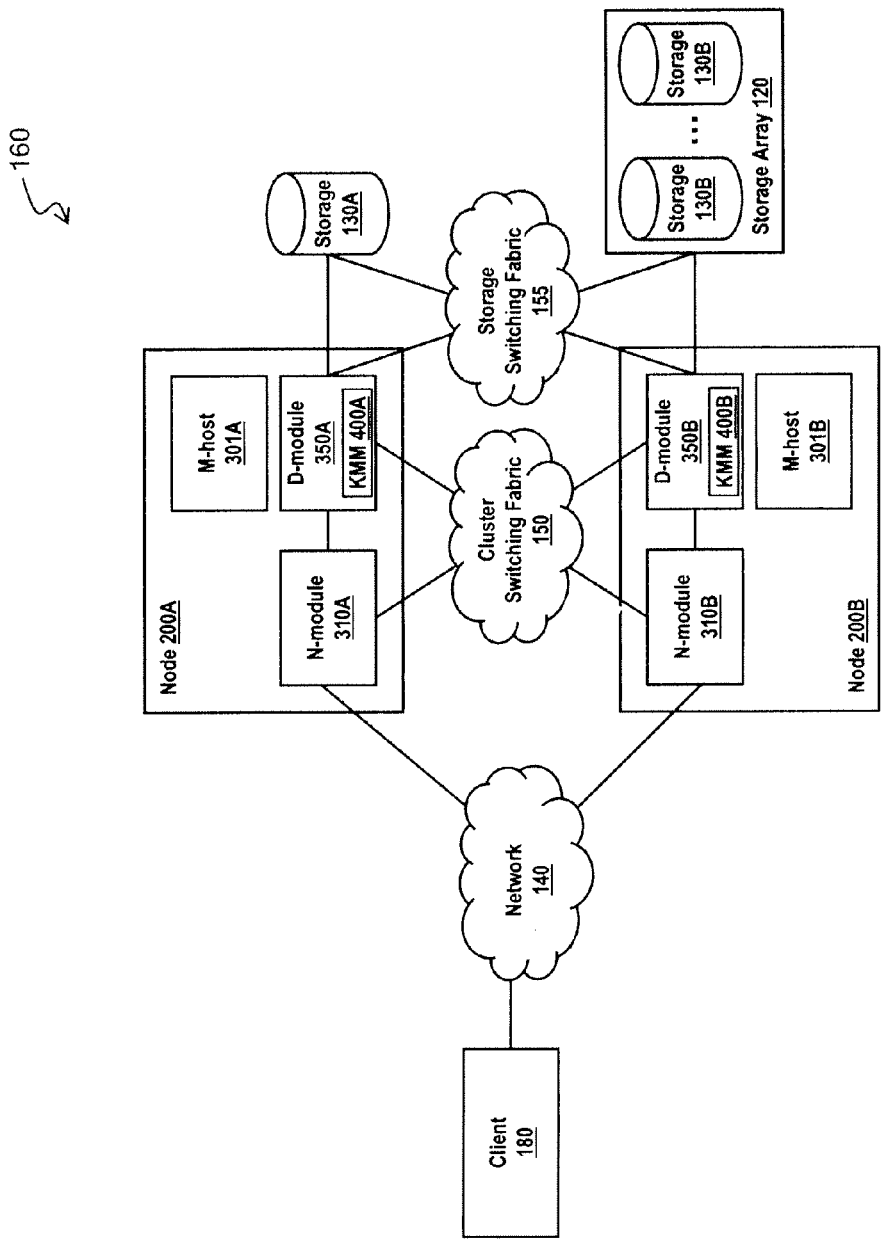
FIG. 1B illustrates a distributed (or clustered) storage system in which the present invention may be implemented.

FIG. 1B shows an illustrative distributed (clustered) storage system 160, also referred to as a "cluster", in which the present invention may advantageously be implemented in one embodiment. Each of the storage servers 200 from FIG. 1A may implement a node in cluster 160 and may be interconnected with other nodes in cluster 160 by a cluster switching fabric 150 embodied as a Gigabit Ethernet switch, for instance. Illustratively, each node includes functional components that operate to provide a distributed storage system architecture across the nodes in cluster 160. To that end, each of the nodes may be generally organized as a set of modules including a network element (N-module 310A, 310B), a data element (D-module 350A, 350B), and a management element (M-host 301A, 301B), for carrying out clustered storage server operations. Illustratively, the N-module includes functionality for enabling a node to connect to client 180 via network 140. In contrast, the D-module connects directly to storage units 130, or indirectly via a storage switching fabric 155 embodied as a fibre channel or Serial-Attached Small Computer System Interface (SAS) link, for instance. Additionally, the M-host provides cluster services for the node to coordinate operations with other nodes in cluster 160.

In one embodiment, a storage operating system operative in the D-module implements a storage abstraction layer to logically organize information within storage units 130 as logical storage objects (e.g., logical volumes). In certain cases, storage provided by each disk of storage units 130 may further be logically organized by the storage abstraction layer as one or more virtual volumes. Client requests received by the node via the N-module may include a unique identifier such as an object ID to indicate a particular logical or virtual volume (each a "volume") on which to carry out the request. Preferably, only one of the D-modules "owns" (services) the volume, whereby the volume may be stored on storage unit 130A and serviced by D-module 350A for example. A client request targeted for the volume may then be received by any of N-modules 310 and forwarded to D-module 350A (e.g., via cluster switching fabric 150) for servicing.

M-host 301 operative in the nodes provides cluster services for the node by managing a data structure such as a replicated database, RDB (not shown), containing cluster-wide configuration information used by the node for forwarding access requests to the appropriate D-module. The various instances of the RDB in each of the nodes may be updated periodically by M-host 301 to bring the RDBs into synchronization with each other. Synchronization may be facilitated by M-host 301 updating the RDB of the node on which it operates (local node) and providing the updated information to the M-hosts of other nodes (remote nodes). In one embodiment, the RDB may include mappings between volumes and D-modules for indicating where requests may be forwarded.

It should be noted that while FIG. 1B shows an equal number of N- and D-modules constituting a node in the illustrative system, there may be different number of such modules constituting a node in accordance with various embodiments of the present invention. For example, there may be a number of N-modules and D-modules of node 200A that does not reflect a one-to-one correspondence between the N- and D-modules of node 200B. As such, the description of a node comprising only one N- and D-module for each of the node in cluster 160 should be taken as illustrative only.

Figure 2A:
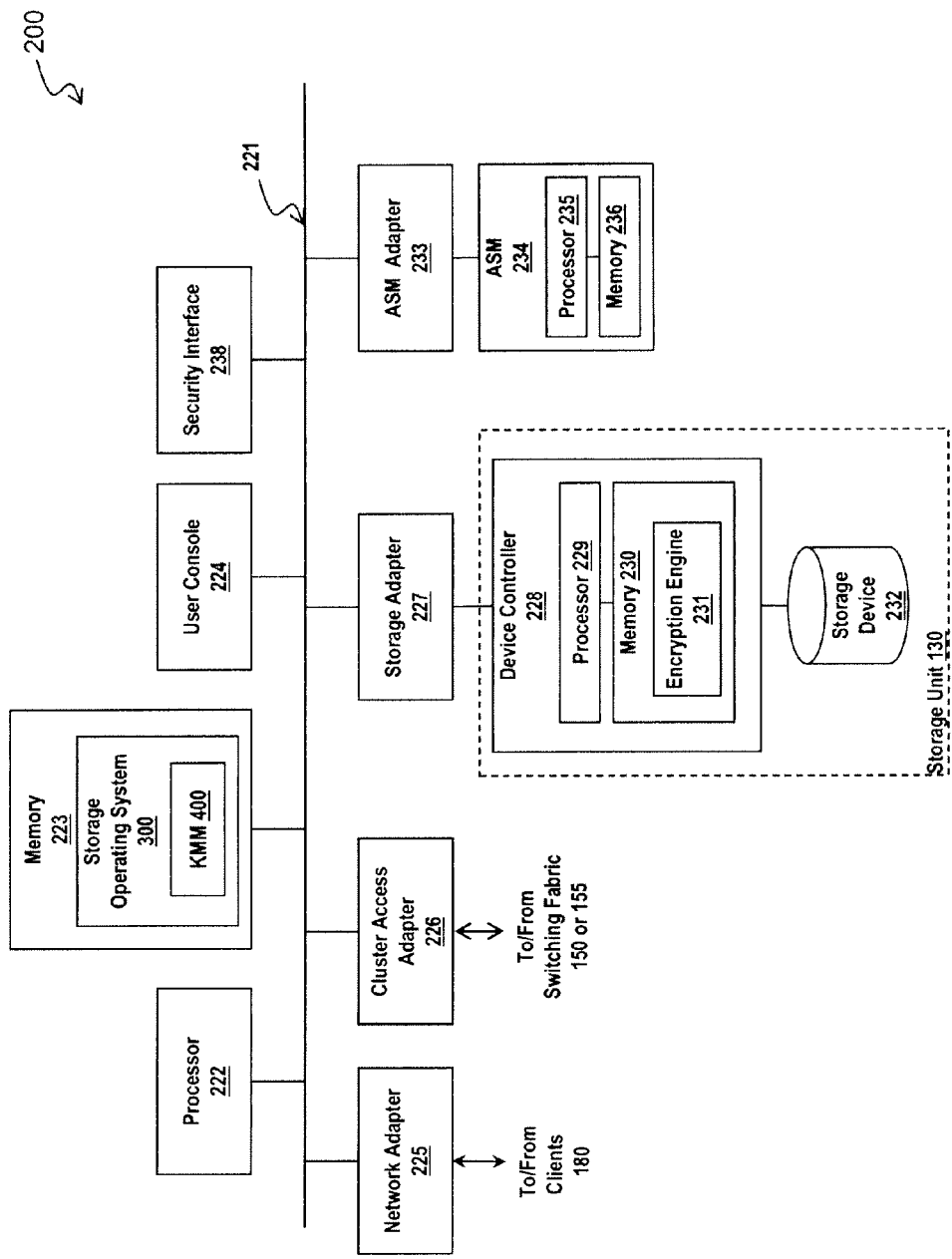
FIG. 2A is a block diagram of an illustrative embodiment of a storage server of FIG. 1A or 1B in which the invention may advantageously be implemented within the storage server.
Figure 2B:
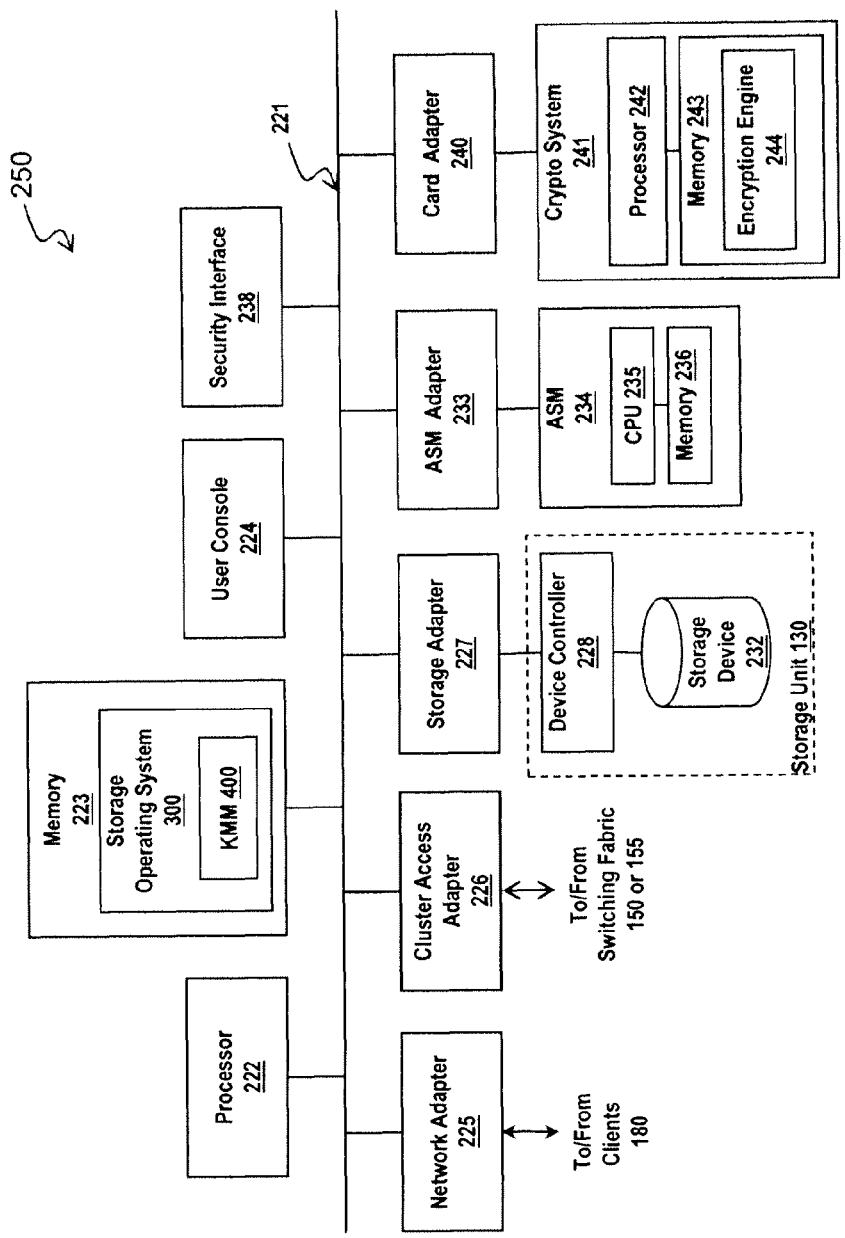
FIG. 2B is a block diagram of an alternative illustrative embodiment of the storage server of FIG. 1A or 1B in which the invention may advantageously be implemented.

Preferably, novel KMM 400 (KMM 400A, 400B) may be operative in each D-module 350 for managing security operations in support of secure storage. Each D-module may include an authenticated storage module (ASM) as shown in FIG. 2A, 2B, which may be accessed by KMM 400 to store key information generated by an encryption engine of the D-module. Security operations managed by KMM 400 also include requesting key information from the ASM and providing the information to the encryption engine upon retrieving data from or storing data to storage units 130. In the event a security operation is requested by the administrator e.g., interfacing with D-module 350 to further secure data, KMM 400 may invoke a security operation based on a state of the ASM.

Computer Architecture

FIG. 2A is a schematic block diagram of a storage server (e.g., storage server 200A, 200B of FIG. 1A) embodied as a general- or special-purpose computer including a processor 222, a memory 223, a network adapter 225, and a storage adapter 227 interconnected by a system bus 221, such as a conventional Peripheral Component Interconnect (PCI) bus. When implemented as a node of a cluster (e.g., cluster 160), the storage server further includes a cluster access adapter 226 comprising one or more ports adapted to couple the node to other nodes in a cluster. In the illustrative embodiment, Ethernet is used as the clustering protocol and interconnect media, although it will be apparent to those skilled in the art that other types of protocols and interconnects may be utilized within the cluster architecture described herein.

Memory 223 comprises storage locations addressable by processor 222 and adapters 225, 226, 227 for storing program instructions and data structures associated with the present invention. Processor 222 and adapters 225, 226, 227 may, in turn, comprise processing elements and/or logic circuitry configured to execute program instructions and manipulate data structures. A storage operating system 300, portions of which are typically resident in memory 223 and executed by the processing elements (e.g., processor 222), functionally organizes the storage server by invoking operations in support of the storage services provided by the storage server. It will be apparent to those skilled in the art that other processing and memory means, including various computer readable media, may be used for storing and executing program instructions pertaining to the invention described herein.

Network adapter 225 comprises one or more ports adapted to couple the storage server to one or more clients (e.g., client 180) over point-to-point links, wide area networks, virtual private networks implemented over a public network (Internet) or a shared local area network, for example. Network adapter 225 may thus comprise the mechanical, electrical and signaling circuitry needed to connect the storage server to network 140, for instance. Each client may communicate with the storage server over the network by exchanging discrete frames or packets of data according to pre-defined protocols, such as TCP/IP.

Storage adapter 227 cooperates with storage operating system 300 executing on the storage server to access information stored on the storage units (e.g., storage units 130) implementing secure storage. The storage units may be embodied as a storage device controller 228 and one or more mass storage devices 232 constituting tape, disks, flash memory or any other similar media adapted to store information. Preferably, storage adapter 227 comprises a plurality of ports having input/output (I/O) interface circuitry to couple the storage devices (e.g., disks) to bus 221 over an I/O interconnect arrangement, such as a conventional high-performance, FC or SAS link topology. In certain embodiments, the storage units may be configured as a storage subsystem providing a shared storage pool between multiple storage servers. To that end, the storage server may access the storage units directly using storage adapter 228 or indirectly using cluster access adapter 226 (e.g., via storage switching fabric 155).

Device controller 228 may further include a processor 229 and a memory 230 for controlling the overall operation of the storage units. Instructions stored in memory 230 may be executed by processor 229 for writing data to storage device 232 in accordance with a write command received from storage operating system 300, and for reading data in accordance with a read command received from storage operating system 300. As used herein, data written by device controller 228 in response to a write command is thus referred to as "write data," whereas data read by device controller 228 responsive to a read command is referred to as "read data."

In one embodiment, an encryption engine 231 resident in memory 230 and executed by processor 229 may automatically encrypt write data upon writing to storage device 232 and automatically decrypt data read from storage device 232. To that end, each write or read command issued by storage operating system 300 may include key information indicating the appropriate key for encrypting and decrypting data. For example, such key information may include the key identifier for a key associated with one of the storage devices 232 (e.g., disk) being accessed. Encryption engine 231 may then retrieve the key from memory 230 based on the supplied key information and automatically encrypt or decrypt data of the disk. Illustratively, a conventional encryption algorithm, e.g., the Advanced Encryption Standard (AES) or other appropriate algorithm, may be implemented by encryption engine 231 to transform unencrypted data into encrypted data and vice versa. In this way, processor 229 may be dedicated to perform security tasks in support of secure storage independent from the operations performed by processor 222.

Advantageously, a key management module (KMM) 400 implemented in storage operating system 300 may manage the overall security operations of the storage server by storing and retrieving key information used by encryption engine 231. Preferably, key information may be generated by encryption engine 231 during initialization of the disk, for example, using a high-quality, pseudo random number generation technique to generate keys. In certain embodiments, encryption engine 231 may further generate a passphrase for a key to secure the key while resident in memory 230. In this instance, the passphrase and passphrase ID also constitute key information to be processed by KMM 400. KMM 400 may then process the key information generated by encryption engine 231 using a key entry to associate the key with the storage device (such as a disk).

In the exemplary embodiment, key information processed by KMM 400 may be stored to an authenticated storage module (ASM) 234 which may provide dedicated storage for processed key information. ASM 234 may be implemented by a portable storage device providing security services for information stored therein, such as a smart card in one example. KMM 400 may access ASM 234 across bus 221 via an authenticated storage module adapter (ASM adapter) 233 which comprises a port having input/output (I/O) interface circuitry for coupling to ASM 234 over a serial I/O interconnect arrangement, for instance. In other embodiments, the ASM may be accessed by KMM 400 over storage switching fabric 155 via storage adapter 227.

Illustratively, ASM 234 includes a processor 235 and memory 236 for providing security services for information stored therein such as processed key information. Security services may, in one embodiment, include authenticating the identities of the administrator and storage server prior to responding to access requests from KMM 400 targeted for memory 236 as described in further detail below. Once authentication is complete, KMM 400 may store key information to, and request key information from, memory 236 of ASM 234 in accordance with aspects of the present invention. In this way, ASM 234 may provide dedicated storage for storing key information processed by KMM 400.

A user console 224 enables a user (e.g., administrator) to interface with the storage server for invoking operations and providing inputs to the storage server. Illustratively, user console 224 may be implemented by a monitor and keyboard in one embodiment. Operations may be invoked and inputs provided by the administrator via command line interfaces or graphical user interfaces in certain instances. In one embodiment, console 224 may be used by the administrator to supply a passphrases for a key which may be processed by KMM 400 and also stored in ASM 234.

In addition, a security interface 238 may implement a special-purpose interface for the administrator requesting a security operation in accordance with embodiments of the present invention. For instance, security interface 238 may be embodied as a switch (e.g., button) disposed on the external housing of the storage server that, when engaged by the administrator, requests operations by KMM 400 to secure data of the storage server. Based on a state of ASM 234 as determined by KMM

400, the security operation may be invoked by KMM 400 to further secure data on storage device 232 by requesting key information from ASM 234 and providing the key information to other modules in storage operating system 300 for implementing additional security measures. In one embodiment, the security operation may involve a shredding operation to overwrite data on the disk or generate a new key associated with the disk.

In this way, security operations may automatically be coordinated by KMM 400 between encryption engine 231 and ASM 234 to provide dedicated resources in support of secure storage. In particular, security operations may be performed by separate processors of the storage server (e.g., processors 222, 229, 235) to avoid the need for shared resources amongst such critical security tasks. Moreover, unauthorized access to memory 223, for instance by other application programs of storage operating system 300, may advantageously be isolated from information stored in memory 230 and memory 236, thereby securely storing key information of the storage server.

In yet another embodiment, cryptographic operations may be performed in a component of the storage server other than device controller 228. FIG. 2B illustrates an exemplary embodiment in which the storage server may include additional components constituting a crypto system 241 performing cryptographic operations within the storage server. Crypto system 241 may be embodied as a PCI Express (PCIe) card, for example, and may connect to KMM 400 via an adapter 240, which comprises a port having input/output (I/O) interface circuitry that couples to crypto system 241 over a serial I/O interconnect arrangement, for example.

An encryption engine 244 resident in a memory 243 of crypto system 241 may be executed by a processor 242 of crypto system 241 for performing security operations in accordance with the present invention. For example, write data and read data may be forwarded to crypto system 241 for encrypting and decrypting data, respectively. In this configuration, key information may further be supplied by KMM 400 to crypto system 241 in support of such tasks. Advantageously, operations of device controller 228 may be dedicated to responding to read and write commands from storage operation system 300, whereas encryption engine 244 of crypto system 241 may be dedicated to perform cryptographic operations within the storage server.

Storage Operating System

Figure 3:
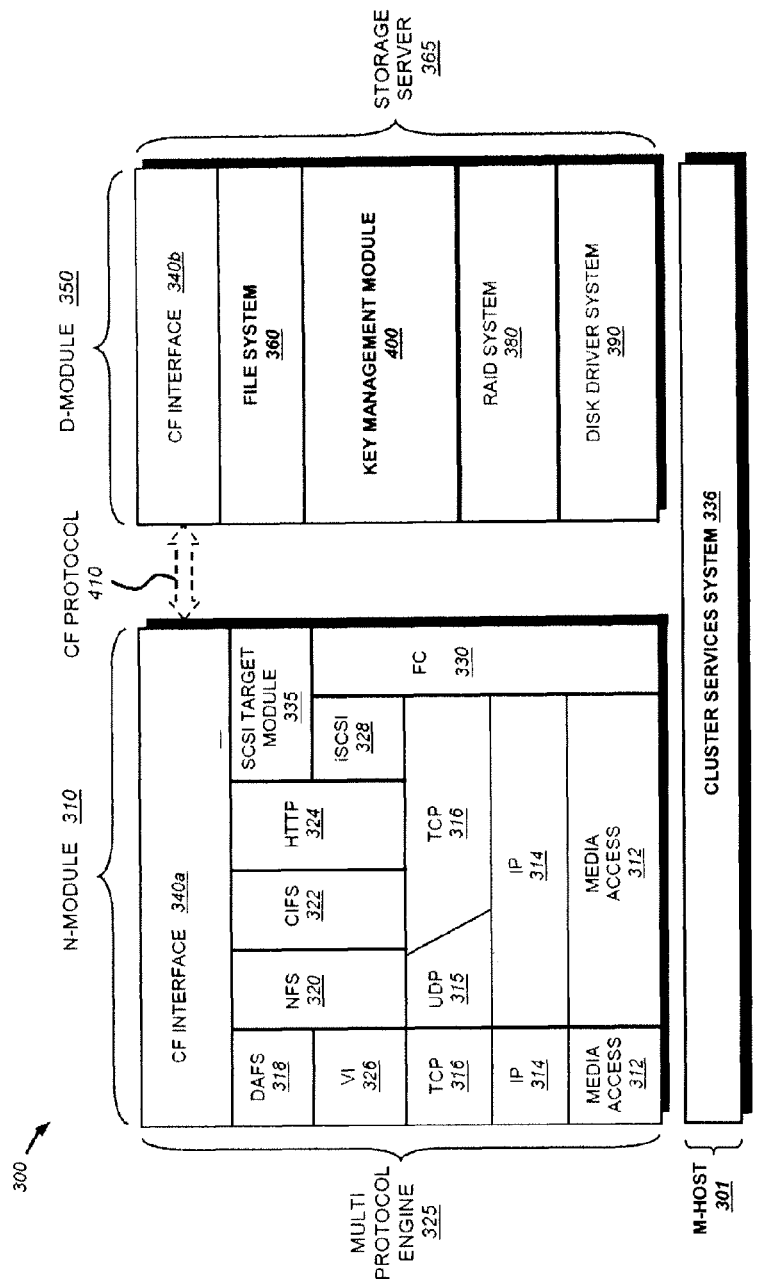
FIG. 3 illustrates an exemplary storage operating system of the storage server of FIG. 2A or 2B implementing a novel key management module (KMM) for managing security operations of the storage server according to an embodiment of the present invention.

FIG. 3 is a schematic block diagram of a storage operating system (e.g., storage operating system 300) that may advantageously implement a key management module in one embodiment. The storage operating system comprises a series of software layers executed by a processor (e.g., processor 222) and organized to form an integrated network protocol stack or, more generally, a multi-protocol engine 325 that provides data paths for clients to access information stored on the storage server using block and file access protocols.

Multi-protocol engine 325 includes a media access layer 312 of network drivers (e.g., gigabit Ethernet drivers) that interface with network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the storage server. In certain cases, a Fibre Channel over Ethernet (FCoE) layer (not shown) may also be operative in multi-protocol engine 325 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 365 that provides data paths for accessing information stored on storage devices implementing secure storage (e.g., storage devices 232). Information may include data received from a client (e.g., client 180), in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

File system 360 implements a virtualization system of the storage operating system through the interaction with one or more virtualization modules illustratively embodied as, e.g., a SCSI target module 335. SCSI target module 335 is generally disposed between drivers 328, 330 and file system 360 to provide a translation layer between the block (lun) space and the file system space, where luns are represented as blocks. File system 360 illustratively implements the WAFL file system having an on-disk format representation that is block-based using, e.g., 4 kilobyte (KB) blocks and using a data structure such as index nodes ("inodes") to identify files and file attributes (such as creation time, access permissions, size and block location). File system 360 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter (e.g., adapter 225). A network driver such as layer 312 or layer 330 processes the packet and, if appropriate, passes it on to a network protocol and file access layer for additional processing prior to forwarding to file system 360. There, file system 360 generates operations to load (retrieve) the requested data from the disks if it is not resident "in core", i.e., in memory 223. If the information is not in memory, file system 360 accesses the inode file to retrieve a logical vbn and passes a message structure including the logical vbn to the RAID system 380. There, the logical vbn is mapped to a disk identifier and device block number (e.g., disk,dbn) and sent to an appropriate driver (e.g., SCSI) of disk driver system 390. The disk driver accesses the dbn from the specified disk and loads the requested data block(s) in memory 223 for processing by the storage server. Upon completion of the request, the node (and operating system 300) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 225, 227 may be configured to offload some or all of the packet processing and storage access operations, respectively, from processor 222, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 350 for accessing data stored on disk. In contrast, multi-protocol engine 325 may be embodied as N-module 310 to perform protocol termination with respect to a client issuing incoming access over the network, as well as to redirect the access requests to any other N-module in the cluster. A cluster services system 336 may further implement an M-host (e.g., M-host 301) to provide cluster services for generating information sharing operations to present a distributed file system image for the cluster. For instance, media access layer 312 may send and receive information packets between the various cluster services systems of the nodes to synchronize the replicated databases in each of the nodes.

In addition, a cluster fabric (CF) interface module 340 (CF interface modules 340A, 340B) may facilitate intra-cluster communication between N-module 310 and D-module 350. For instance, D-module 350 may expose a CF application programming interface (API) to which N-module 310 (or another D-module not shown) issues calls. To that end, CF interface module 340 can be organized as a CF encoder/decoder using local procedure calls (LPCs) and remote procedure calls (RPCs) to communicate a file system command to between D-modules residing on the same node and remote nodes, respectively.

Illustratively, the storage operating system issues a read- or write-command to a storage device controller (e.g., device controller 228) through disk driver system 390 for accessing a physical storage object (e.g., disk) using the disk identifier mapped from the logical vbn by RAID system 380. In one embodiment, the resultant read data and write data may automatically be processed by an encryption engine of the storage server (e.g., encryption engine 231, 244) to encrypt and decrypt data of a disk. To that end, the storage operating system may implement a key management module (e.g., KMM 400) to manage security operations of the storage server using an authenticated storage module (ASM) of the storage server (e.g., ASM 234). For instance, KMM 400 may process key information generated by the encryption engine and store such information in dedicated storage of the ASM (e.g., memory 236). Upon the storage operating system generating a read- or write-command, KMM 400 may request key information from the ASM based on the disk being accessed or to be accessed, and provide such information to the encryption engine for processing read data and write data.

In the event a security operation is requested by an administrator (e.g., interfacing at security interface 238), KMM 400 may also invoke the requested security operation on data stored on the disk based on a state of the ASM. For instance, the state of the ASM may involve a "connected" state whereby the ASM is physically connected to the storage server and authentication by the ASM has been complete. Upon determining the connected state, KMM 400 may retrieve key information from the ASM and interface with various modules of the storage operating system, such as disk driver system 390 in one instance, for carrying out the requested security operation using the retrieved key information. An example of a security operation may include executing a write-command to overwrite data on the disk whereas another example may include the encryption engine generating a new key for the disk. Additional details of the security operation are described further in reference to FIG. 4.

Although the present invention is shown herein to implement KMM 400 in the storage operating system, it will be appreciated that KMM 400 may be implemented in other modules or components of the storage server in other embodiments. In addition, KMM 400 may be implemented as one or a combination of a software-executing processor, hardware or firmware within the storage server. As such, KMM 400 may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write in place file systems.

Key Management Module

Figure 4:
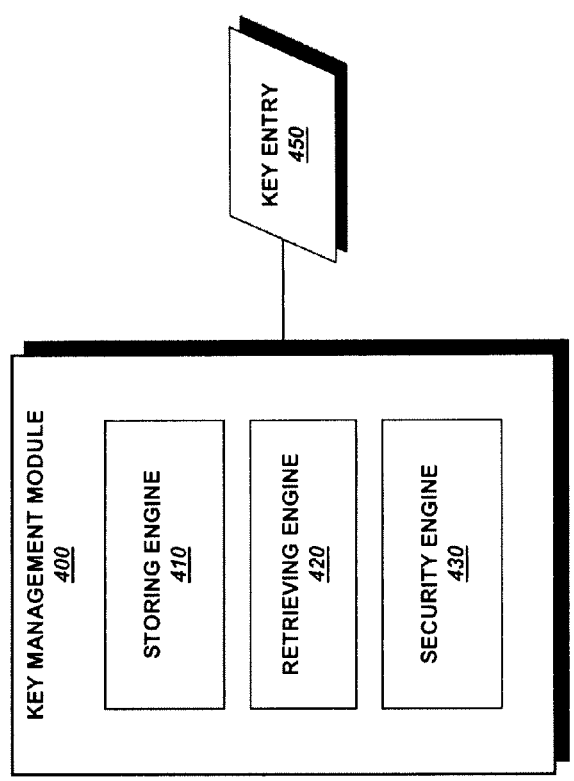
FIG. 4 illustrates a block diagram of the KMM of FIG. 3, including functional components of the KMM, which manage security operations using an authenticated storage module (ASM) of the storage server in accordance with certain embodiments of the present invention.

FIG. 4 is a schematic block diagram illustrating a key management module (e.g., KMM 400) implemented by a storage operating system (e.g., storage operating system 300) to automatically manage security operations of the storage server (e.g., storage server 200) using an authenticated storage module (ASM) of the storage server. In one embodiment, the KMM may be implemented as instructions stored in memory (e.g., memory 223) and executed by a processor (e.g., processor 222) of the storage server. Advantageously, the memory and processing components implement the KMM may be separate from other memory and processing components implementing an encryption engine (e.g., encryption engine 231, 244) and the ASM (e.g., ASM 234) to provide a secure operating environment in support of secure storage. In other embodiments, the KMM may be implemented in various other components and/or modules of the storage server in accordance with teachings of the present invention, so the novel techniques are not so limited to the exemplary description provided herein.

Illustratively, components of the KMM include a storing engine 410, a retrieving engine 420, and a security engine 430. During initialization of a storage device (e.g., storage device 232 embodied as a disk), for instance, an object ID (e.g., disk ID) may be forwarded to storing engine 410 for storage in a data structure such as key entry 450. Key entry 450 may be generated by storing engine 410 and stored in memory 223 for example. In addition, the encryption engine may generate a new key, including a unique key identifier (key ID) associated with the key, for storage in memory assessable by the encryption engine (e.g., memory 230, 243). For ease of explanation, memory 223 may be referred to as "storage server memory," whereas memory 230, 243 accessed by the encryption engine may be referred to as "encryption engine memory." The key ID may thereafter be forwarded by the encryption engine to storing engine 410 which stores the key ID in conjunction with the disk ID in key entry 450, thereby result in a mapping between the key and disk. The contents of key entry 450 in this way constitute the key information processed by storing engine 410.

In certain embodiments, a passphrase may also be associated with a key for further securing the key while resident in encryption engine memory. In general, implementing a passphrase involves another layer of encryption to protect against unauthorized access to locations where the actual keys are stored. In one example, upon generating the key, the encryption engine may automatically generate another key and key ID constituting the passphrase, and encrypt the key using passphrase. The encryption engine may also generate an indicator for the encrypted key to indicate its encrypted form as stored in encryption engine memory. A key ID as well as a passphrase ID may then be forwarded by the encryption engine to storing engine 410 for storage in key entry 450. In this instance, key entry 450 may also include a passphrase ID associated with the key ID resulting in a mapping between the passphrase, key, and disk.

In other embodiments, the passphrase may be supplied by the administrator e.g., interfacing at console 224 and inputting a disk ID and a passphrase. The disk ID may be forwarded to retrieving engine 420 operative to retrieve the key ID associated with the disk ID as discussed further below. Once received, the key ID and passphrase may be forwarded to the encryption engine where a key ID is generated for the passphrase, and the key is accordingly encrypted using the passphrase and indicated as such in encryption engine memory. The encryption engine may then forward both the key ID and passphrase ID to storing engine 410 for storage in key entry 450.

To securely store the key information processed by storing engine 410, the key information may be forwarded by storing engine 410 to the ASM which provides security services for information stored therein. Security services may include, for example, the ASM authenticating the identity of the administrator and storage server prior to responding to read and write requests from storing engine 410. In one embodiment, during initialization of the ASM, the storage operating system may supply a system ID to the ASM for storage in memory of the ASM (e.g., memory 236). In addition, the administrator may also interface at console 224 to supply the ASM with a user ID for storage in memory 236. For ease of explanation, memory 236 may be referred to as "ASM memory."

If the ASM is later detached and re-connected to the storage server, authentication may be performed by the ASM requesting a system ID from the storage operating system and a user ID from the administrator. Upon receipt of the requested information, the ASM may compare the received IDs with those stored in ASM memory obtained during initialization. If a match exists, the ASM may be operative to respond to read and write requests from storing engine 410. If a match does not exist, or the ASM is not otherwise physically connected to the storage server, a request by storing engine 410 to write key information to ASM memory may result in an error. It will be appreciated that other embodiments of the present techniques may include additional or other operations performed by the ASM to provide security services for information stored in ASM memory, so the present description of security services are for exemplary purposes only.

Illustratively, the ASM may implement a data structure in ASM memory for storing the key information provided by storing engine 410 as shown in an exemplary key map 500 of FIG. 5. Key map 500 may include multiple fields for tracking key information of multiple disks as processed by storing engine 410. To that end, key map 500 may include an object_ID 510 field constituting a disk ID. An encryption_key_ID 520 field and passphrase_ID 530 field may also be included in key map 500 for indicating the particular key and passphrase associated with the disk. In some embodiments, key map 500 may further include one or more additional fields 540 for storing other information associated with the storage object, key or passphrase.

Returning to FIG. 4, retrieving engine 420 of the KMM may be operative to request key information from the ASM in support of the various operations performed by the KMM. For instance, the storage operating system may receive an access request from a client or otherwise need to access system data and thus generate a read- or write-command. The disk ID of the disk for which access is requested may also be included in the command, and upon generation of the command retrieving engine 420 may request key information from the ASM based on the disk ID in the command. When connected to the storage server and authentication has been successful, the ASM may retrieve the key ID and passphrase ID from key map 500 based on the disk ID, and provide the key and passphrase IDs to retrieving engine 420 in response to the request. Retrieving engine 420 may then forward such information to the encryption engine of the storage server.

With read-commands, data may first be retrieved by a storage device controller (e.g., device controller 228) controlling operations of the disk. The read data may then be forwarded to the encryption engine in a request to decrypt the data. In contrast, write-commands may first be processed by the encryption engine in a request to encrypt the data, with the encrypted data forwarded to the storage device controller for storage to disk. Illustratively, the encryption engine may perform the requested cryptographic operation using the key information from retrieving engine 420 by retrieving the key corresponding to the key ID from encryption engine memory. If the key is indicated to be encrypted, the encryption engine may also retrieve the key associated with the passphrase ID, and decrypt the encrypted key prior to using the key to encrypt or decrypt data of secure storage.

Advantageously, a security operation to further secure data on disk may be invoked by security engine 430 of the KMM in certain embodiments of the present invention. Additional security measures may be desirable when the administrator determines that locations on disk or in memory may be exposed to unauthorized access. Under conventional techniques, the administrator must manually coordinate such operations between multiple processing systems such as the storage server and a remote key manager to implement the added security. In contrast, the administrator may now simply engage a switch at the storage server (e.g., security interface 238) to request the added security measures which may automatically be invoked by security engine 430 based on a state of the ASM.

In detail, security engine 430 may first determine a state of the ASM in response to the request from the administrator. In one embodiment, the state of the ASM may involve a connected state or disconnected state. A connected state may indicate that the ASM is physically connected to the storage server and authentication of the identities of the administrator and storage server has been successful. Alternatively, a disconnected state may indicate that the ASM is not functioning properly, is physically disconnected from the storage server, has performed an unsuccessful authentication attempt, or involves any other operating condition which would prevent access to ASM memory. It will be appreciated that certain embodiments of the present invention may involve different or other states of the ASM, so the invention is not limited to the states described herein.

Illustratively, security engine 430 determines a connected state of the ASM by automatically receiving key information from the ASM in response to a request. In other cases, security engine 430 may send a request to the ASM to confirm a connected state of the ASM. For example, the ASM may retrieve a state indicator from ASM memory indicating that authentication has been completed and therefore a connected state exists. The ASM may then send a response indicating the connected state. In contrast, a negative response, including instances where no response is received by the KMM, may indicate a failure with the ASM such as failed authentication attempt, a physical disconnection of the ASM, or any other ASM operating condition which would prevent the ASM from properly responding to requests from retrieving engine 420.

In one embodiment, the security operation may involve a shredding operation such as a data shred or crypto shred. A data shred involves overwriting bits on disk constituting the underlying data to effectively delete the data. This may be preferable in situations where it is desirable to thwart any potential hardware or software recovery of data. In contrast, a crypto shred may implement new keys for securing data on disk so unauthorized access to encryption engine memory or ASM memory does not facilitate further access to the native data in secure storage. To that end, security engine 430 may carry out a shredding operation by invoking retrieving engine 420 to request key information from the ASM so operations may be performed on the disks indicated in the key information.

In detail, data shredding may involve the storage operating system overwriting data of the disks by e.g., writing zero bits to data blocks of the disk. In certain embodiments, an overwriting operation may involve writing a pre-configured or administrator-selected bit pattern to locations on disk and/or writing the bit pattern multiple times to disk (each write iteration referred to as a "pass"). The bit pattern, for instance, may be implemented as a data structure such as a data array which may be repeated to conform to a particular amount of data (e.g., size of a disk). The bit pattern as well as the number of passes may be pre-configured by a manufacturer of the storage server and stored in storage server memory (e.g., memory 223), for example.

Security engine 430 may then invoke operations of retrieving engine 420 to request key information from the ASM, including the disk IDs stored in key map 500. Based on the received disk IDs, security engine 43 may request a data shred operation on the disks associated with the disk IDs. The data shred operation may then involve, for each disk, the storage operating system processing the bit pattern to correspond to the size of the disk, generating a request to overwrite data on the disk using the processed bit pattern and in accordance with a number of passes, and the storage device controller writing the bit pattern to disk accordingly.

A crypto shred, in contrast, may involve security engine 430 invoking the encryption engine to generate new keys for the disks so data remains accessible. Here, key information received by retrieving engine 420 from the ASM includes the disk ID and corresponding key and passphrase IDs. A request may then be generated by security engine 430 to perform a crypto shred on the indicated disk, and be forwarded to the storage device controller. Upon receipt of a request, the storage device controller may retrieve data from the indicated disk and the encryption engine may decrypt the retrieved data using the key associated with the key ID supplied by security engine 430. A new key may also be generated by the encryption engine for the disk and used to re-encrypt the data. The new keys information, including the new key ID, may be forwarded to storing engine 410 for mapping or otherwise associating the new key with the disk, and for storing the new key information in the ASM. In addition, the storage device controller may store the re-encrypted data back to locations on disk so data may remain available yet secure despite potential unauthorized access to the ASM and encryption engine.

Advantageously, operations of the KMM may be carried out to secure data of the storage server without the manual coordination of operations between dedicated processing systems. Dedicated components within the storage server may be operative to perform the security tasks of the storage server by the KMM coordinating operations between the encryption engine and the ASM. In addition, such tasks may be carried out securely within the storage server since locations where keys are stored (e.g., encryption engine memory) are separate from locations where the key maps are stored (e.g., ASM memory). Moreover, the KMM may perform operations in support of providing additional security measures for further ensuring the security of data within the storage server by invoking security operations based on a state of the ASM.

Key Information

Figure 6:
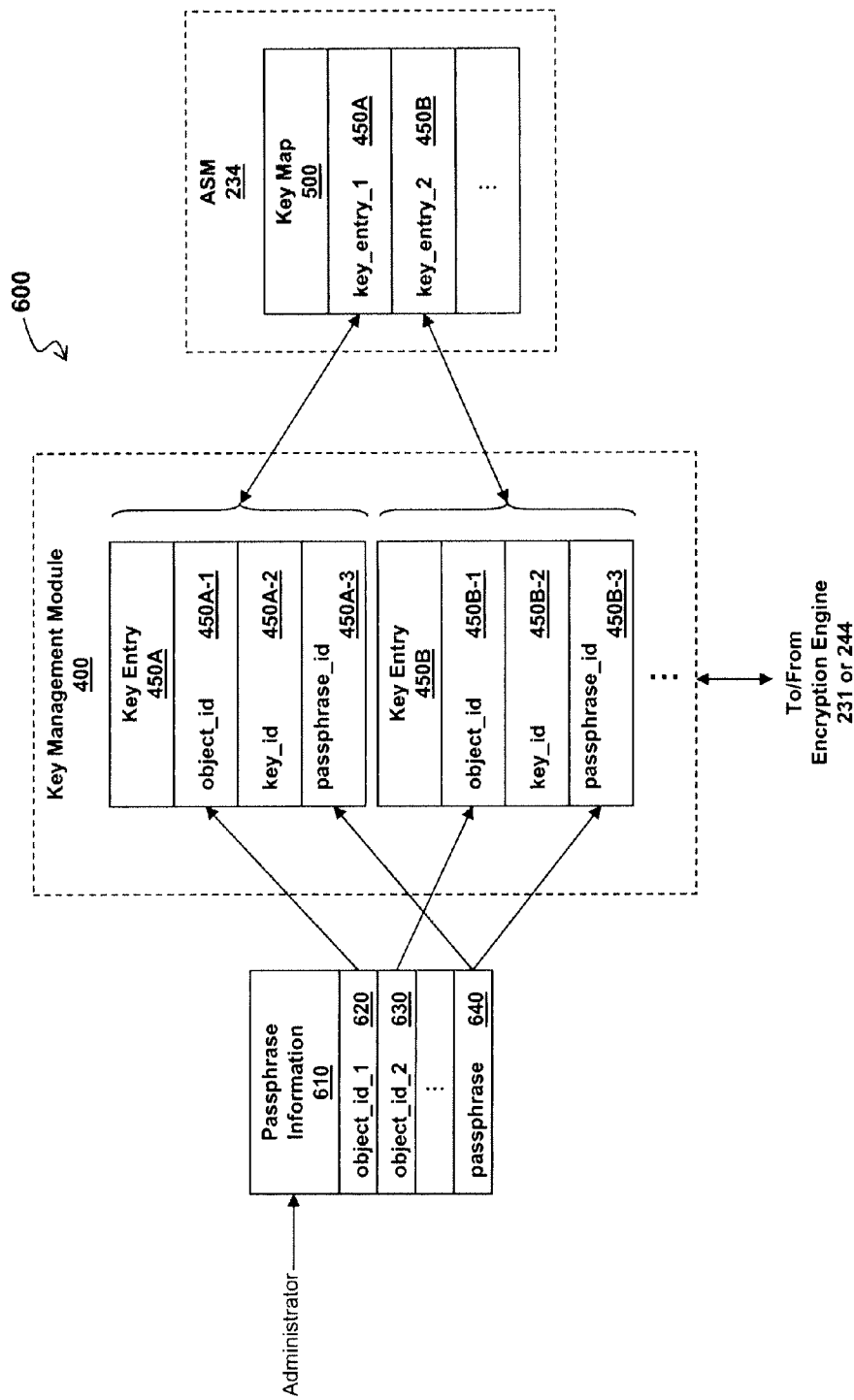
FIG. 6 illustrates exemplary key information processed by the KMM and stored to the ASM according to one embodiment of the present invention.

FIG. 6 shows an exemplary environment 600 of key information generated by an encryption engine (e.g., encryption engine 231, 244) which may be processed by the key management module (e.g., KMM 400) and stored to an authenticated storage module (e.g., ASM 234) of the storage server. As shown therein, passphrase information 610 may be supplied by the administrator (e.g., interfacing at console 224) for securing keys resident in encryption engine memory (e.g., memory 230, 243). In other embodiments, the encryption engine may generate the passphrase automatically without the need for the administrator to manually input passphrase information 610. Illustratively, the administrator may supply a passphrase 640 and one or more disk IDs (object_id__1 620, object_id__2 630) associated with passphrase 640 for use in securing the keys used by the encryption engine.

A storing engine of the KMM (e.g., storing engine 410) may then process passphrase information 610 in addition to other key information generated by the encryption engine using data structures such as key entries 450 (key entry 450A, key entry 450B) for each of the disks. Each key entry 450 may include at least a disk ID (object_id 450A-1, 450B-1) and key ID (key_id 450A-2, 450B-2) for indicating an association between a disk and key. Where the key itself is stored in encrypted form in encryption engine memory, key entry 450 may also include a passphrase ID (passphrase_id 450A-3, 450B-3) for storing passphrase information corresponding to an encrypted key. Illustratively, the encryption engine may forward key information to the storing engine each time key information is generated, such as during initialization of a disk or when a crypto shred is performed.

Contents of key entries 450 constituting key information may then be provided to the ASM of the storage server where such information may be stored in a data structure such as key map 500. Thereafter, when a cryptographic operation is requested of the encryption engine, a retrieving engine of the KMM (e.g. retrieving engine 420) may request key information from the ASM for a particular disk. The ASM may then retrieve the appropriate key ID (including a passphrase ID, if any) by traversing key map 500 based on a disk ID supplied by the retrieving engine. Upon receipt of the appropriate key ID from the ASM, the retrieving engine may forward the key and passphrase ID to the encryption engine for carrying out the requested cryptographic operation.

In instances where a security operation is requested by the administrator, a security engine of the KMM (e.g., security engine 430) may request key information stored in key map 500 for invoking the security operation on the disks indicated therein. When a data shredding operation is involved, the security engine may forward the disk IDs to the storage operating system for generating an overwrite request. When a crypto shredding operation is involved, the security engine may forward the disk IDs, as well as the key ID and passphrase ID, to the encryption engine for decrypting data using the indicated keys prior to generating new keys and re-encrypting data using the new keys. The new key information may similarly be processed as a key entry 450 and forwarded to the ASM for dedicated storage in key map 500.

Processing Key Information

Figure 7:
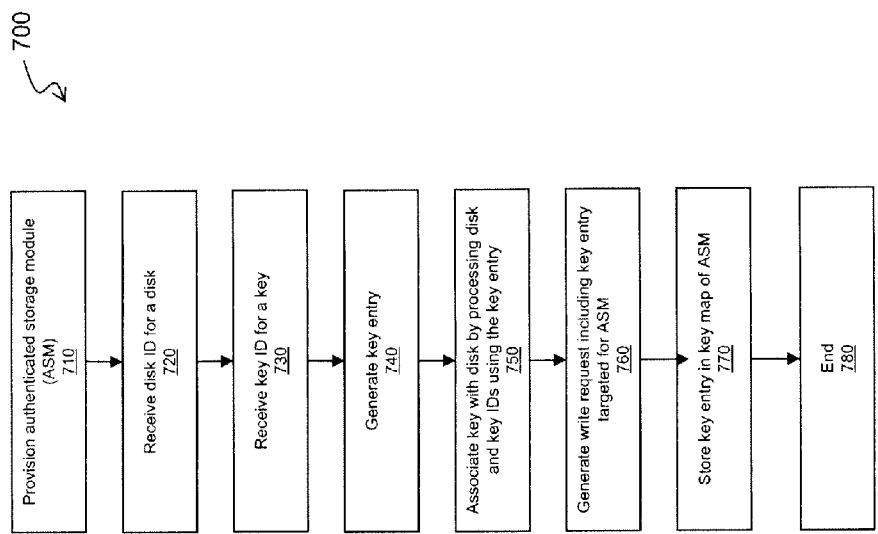
FIG. 7 illustrates a flow diagram of an exemplary process of the KMM processing key information to associate a key with a storage object of the storage server according to one embodiment of the present invention.

FIG. 7 illustrates a flow diagram of an exemplary process 700 for the KMM (e.g., KMM 400) managing security operations by processing key information targeted for dedicated storage of the ASM (e.g., ASM 234) according to one embodiment of the present invention. The processing may be performed by the KMM to result in an association between a key with a storage object (e.g., disk) of the storage server in support of secure storage. Process 700 may commence at step 710, where the ASM is provisioned for storing information as requested by the KMM. Preferably, the ASM may be provisioned by the administrator physically connecting the ASM to the storage server and the ASM automatically performing security services upon being connected to the storage server. In one embodiment, the security services may involve the ASM authenticating the identities of the storage server and the administrator. Thereafter, the ASM may be operative to store information in a secure environment as requested by the KMM.

At step 720, a disk ID may be received by a storing engine of the KMM (e.g., storing engine 410) upon initialization of a disk. Initialization of the disk may further invoke operations of the encryption engine (e.g., encryption engine 231, 244) generating new key information (e.g., a key and key ID) to be stored in encryption engine memory (e.g., memory 230, 243). In one embodiment, a passphrase may also be generated or processed by the encryption engine for securing the newly generated key. Here, the encryption engine may encrypt the newly generated key before storing the encrypted key to encryption engine memory. The key and passphrase IDs from the key information may then be provided by the encryption engine to the KMM, where the IDs may be received by the storing engine of the KMM (step 730).

At step 740, the storing engine may generate a key entry data structure (e.g., key entry 450) for processing the key information (e.g., key and passphrase IDs) received from the encryption engine. The storing engine may then store the disk ID, as well as the key and passphrase IDs, to the key entry to generate an association between the disk, key and passphrase in support of secure storage (step 750). Advantageously, the key entry may be stored in storage server memory (e.g., memory 223) separate from the encryption engine memory to await further processing.

Proceeding with process 700, the storing engine may generate a write request including the processed key information of the key entry (step 760). The write request may then be forwarded by the storing engine to the ASM at step 770, where the key information is stored in a key map (e.g., key map 500) resident in ASM memory (e.g., memory 236). The process may end at step 780 such that keys may be stored in one location (e.g., encryption engine memory), whereas a key map indicating the associations between keys and disks may be stored in another location (e.g., ASM memory). Due to the coordination of tasks by the storing engine between the encryption engine and ASM, data of the storage server may be managed in a secure manner by distributing such data throughout various storage locations within the storage server to defend against unauthorized access to any one of such storage locations.

Security Operations in Support of Securing Data

Figure 8:
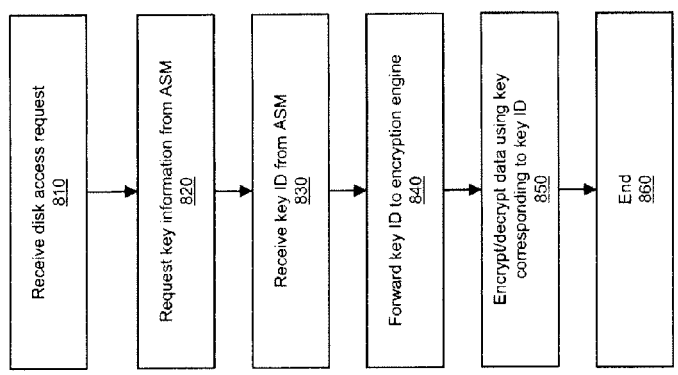
FIG. 8 illustrates a flow diagram of an exemplary process for the KMM managing security operations of the storage server when performing a cryptographic operation on a storage object of the storage server according to one embodiment of the present invention.

FIG. 8 illustrates a flow diagram of an exemplary process 800 for the KMM coordinating operations between the encryption engine of the storage server and the ASM to secure data of a storage object in one embodiment. Preferably, a retrieving engine of the KMM (e.g., retrieving engine 420) may automatically request key information from the ASM to ensure the appropriate key is used by the encryption engine to encrypt or decrypt data in secure storage. In another instance, key information may be requested by the retrieving engine in support of a security engine of the KMM (e.g., security engine 430) invoking a security operation such as a shredding operation.

Process 800 starts at step 810, where a storage device (e.g., disk) access request is received by the retrieving engine. The request may be generated by the storage operating system (e.g., storage operating system 300) to include the disk ID by which data will be read from or written to, and then forwarded to the retrieving engine. At step 820, a request for key information is sent by the retrieving engine to the ASM. The request may include the disk ID corresponding to an entry within a key map (e.g., key map 500) of the ASM. In response to the request, the ASM may traverse the key map to determine the key ID and passphrase ID, if any, associated with the disk ID. The associated key ID and passphrase ID may then be received by the retrieving engine from the ASM in response to the request (step 830).

At step 840, the key ID and passphrase ID may be forwarded by the retrieving engine to the encryption engine for performing the necessary cryptographic operation. The encryption engine may then traverse the keys stored in encryption engine memory (e.g., memory 231, 244) based on the key ID supplied by the retrieving engine. In one embodiment, the key may be associated with an indicator for indicating the key is resident in encrypted form. In those instances, the encrypting engine may retrieve the key associated with passphrase ID for first decrypting the encrypted key. The decrypted key may then be used to decrypt read data or encrypt write data (step 850) thereby providing secure storage within the storage server.

Figure 9:
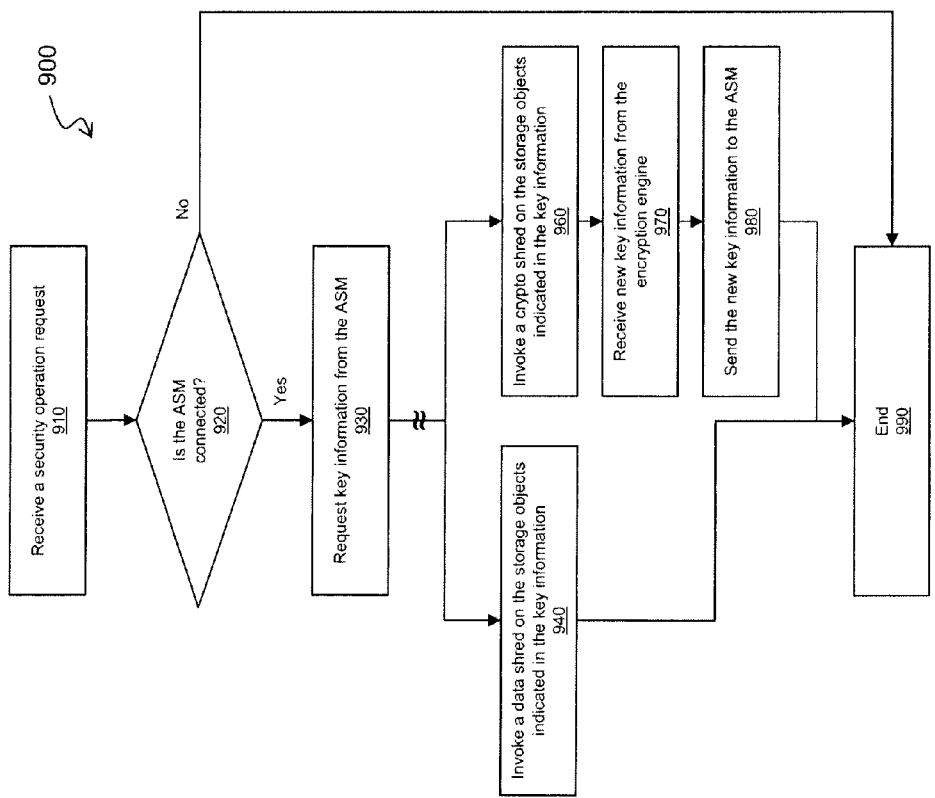
FIG. 9 illustrates a flow diagram of an exemplary process for the KMM invoking a security operation based on a state of the ASM according to one embodiment of the present invention.

Process 800 ends at step 860 whereby security operations within the storage server may be carried out by the retrieving engine of the KMM to avoid the inefficient coordination of such tasks between dedicated processing systems. Since key information may now reside locally (in close physical proximity) to the encryption engine, system resources including network bandwidth may be optimized to respond to client requests while still providing secure storage of data. Accordingly, the coordination of dedicated processing resources by the KMM facilitates the execution of cryptographic and key management operations in a secure manner within an integrated system. Invoking a Security Operation FIG. 9 illustrates a flow diagram of an exemplary process 900 for the KMM implementing additional security measures by invoking a security operation based on a state of the ASM according to one embodiment of the present invention. Advantageously, process 900 may be implemented to provide additional security measures while avoiding the need to coordinate such operations between remote processing systems.

Process 900 may start at step 910, where a security operation request is received by a security engine of the KMM (e.g., security engine 430). Preferably, the request is generated when the administrator interfaces at security interface (e.g., security interface 238); however, such a request may alternatively be requested by the administrator interfacing at a general-purpose console (e.g., console 224) in other embodiments. At step 920, the security engine determines a state of the ASM prior to invoking the security operation. In one embodiment, a state of the ASM may be a connected state whereby the ASM is physically connected to the storage server and successful authentication of the storage server and administrator has been performed by the ASM. The connected state may be determined, for example, by the security engine requesting a current state of the ASM and receiving a connected state response. In the event the connected state cannot be determined by the security engine, process 900 ends at step 990 and the requested security operation cannot be invoked.

Alternatively, when the state is determined to be connected, the security engine may invoke operations of a retrieving engine (e.g., retrieving engine 420) to request key information from the ASM (step 930). Here, the retrieving engine may request key information stored in ASM memory such as the disk IDs corresponding to secure storage for performing the security operation on the indicated disks. In one embodiment, a data shred operation may be performed at step 940 based on the disk IDs retrieved from the ASM. The data shred may involve the storage operating system writing a bit pattern to locations on disk associated with the disk ID to effectively delete data on disk. When completed, data remains secure by virtue of being unrecoverable by any hardware or software means, and process 900 ends at step 990.

In other embodiments, a crypto shred implementing the security operation may be invoked at step 960. Here, encrypted data may be retrieved from secure storage and decrypted using the key information supplied by the security engine. The security engine may further invoke the generating of new keys by the encryption engine for use in re-encrypting the data, with the new key information being forwarded by the encryption engine to a storing engine of the KMM (e.g., storing engine 410) at step 970. At step 980, the storing engine of the KMM may process the new key information (e.g., using key entries) and send the key information to the ASM for updating the key map stored therein. Upon completing the security operation, process 900 ends at step 990 to provide additional safeguards to further secure data of the storage server.

Using the techniques described herein, the present invention overcomes the deficiencies of the conventional approaches by using a key management module (KMM) to coordinate operations between an encryption engine and authenticated storage module (ASM) of the storage server in support of secure storage. Security operations may be coordinated automatically by the KMM in a secure manner to maintain separate storage locations for the keys and key maps. Since the KMM, encryption engine, and ASM may be implemented in different components of the storage server, critical operations in support of secure storage need not compete for resources in carrying out respective tasks. Overhead may also be minimized to reduce the manual effort otherwise required by the administrator in managing more conventional configurations. Efficiencies in secure storage processing may thus be realized to provide a performance improvement over the conventional methods and systems.

It will be appreciated that the variations and examples discussed herein are not intended to be exhaustive or to limit the invention. These variations and examples intend to provide further understanding of embodiments of the present invention.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Unless specifically stated otherwise, it is to be appreciated that throughout the discussions utilizing terms such as "processing" or "computing" or "calculating" or "determining" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) data structures and each coupled directly or indirectly to a computer system bus (or the like) for access. Each of these media may be coupled to a computer system bus through use of an appropriate device for reading and or for writing the media.

What is claimed is:

1. A computer-implemented method comprising:
receiving, by a key management module (KMM) of a storage server, an object identifier of a storage object stored by a storage device of the storage server;

receiving, from an encryption engine of the storage server, a key identifier of a key utilized by the storage server to secure data of the storage object;

processing the object identifier and the key identifier to result in a mapping between the object identifier of the storage object and the key identifier of the key;

storing, by an authenticated storage module (ASM), the mapping in a memory of the ASM separate from the storage server to result in dedicated storage of the mapping, wherein the ASM is implemented by a portable storage device comprising a processor and the memory, wherein the ASM is operable to be physically coupled to the storage server and does not store the key, and wherein the storage device of the storage server stores the key but not the mapping;

receiving, by the KMM, a request to perform a security operation upon the storage object;

determining, by the KMM, a connected state of the ASM, wherein the connected state indicates whether the ASM is physically connected to the storage server and whether the ASM has authenticated identities of both the storage server and an administrator of the storage server; and invoking, by the KMM, the security operation on the storage object based on determining the connected state of the ASM, wherein said invoking includes,
retrieving the mapping from the ASM,
determining the key associated with the storage object based on the key identifier in the mapping, and
performing the security operation on data of the storage object using the key.

2. A computer-implemented method of claim 1, wherein the portable storage device implementing the ASM comprises a smart card.

3. A computer-implemented method of claim 1, further comprising receiving the object identifier from the storage device during an initialization of the storage device.

4. A computer-implemented method of claim 1, further comprising:
receiving a passphrase identifier of a passphrase, the passphrase operative to secure the key while stored in an encryption engine memory of the encryption engine; and
processing the passphrase identifier with the mapping to associate the passphrase with the key and storage object.

5. A computer-implemented method of claim 1, wherein the ASM performs security services prior to storing the mapping in the memory of the ASM.

6. A computer-implemented method of claim 1, wherein the security operation comprises a shredding operation.

7. A computer-implemented method of claim 6, wherein the shredding operation comprises overwriting data of the storage object using a selected bit pattern.

8. A computer-implemented method of claim 1, wherein the security operation comprises performing a crypto shred by:
retrieving the storage object;
decrypting the storage object, using the key identified by the key identifier, to yield a plaintext storage object;
encrypting the plaintext storage object using a new key identified by a new key identifier;
storing the new key using the storage device of the storage server; and
updating the ASM memory to reflect a new mapping between the storage object and the new key.

9. A key management system comprising:
a processor; and
a memory coupled to the processor and configurable for storing instructions, which, when executed by the processor cause the processor to:
process, by a storing engine, a key identifier generated by an encryption engine accessing a first memory of a storage server to indicate a mapping between a key identified by the key identifier and an object identifier of a storage object stored by the storage server;
store, by the storing engine, the mapping in a second memory of an authenticated storage module (ASM), wherein the ASM is to be implemented by a portable storage device comprising a second processor and the second memory, wherein the ASM is operable to be coupled to the storage server, wherein the second memory of the ASM does not store the key, and wherein the first memory of the storage server stores the key but not the mapping;
request, by a retrieving engine, the mapping from the second memory of the ASM;
forward, by the retrieving engine, the key identifier of the requested mapping to the encryption engine for performing a cryptographic operation on data of the storage object;
receive a request, by a security engine, to perform a security operation upon the storage object;
determine, by the security engine, a connected state of the ASM, wherein the connected state indicates whether the ASM is physically connected to the storage server; and
invoke, by the security engine, the security operation on the storage object based on the determined connected state of the ASM and further based upon whether the ASM has authenticated identities of the storage server and an administrator of the storage server.

10. A key management system of claim 9, wherein the instructions further cause the processor to
receive, by the storing engine, the object identifier during an initialization of the storage object; and
associate the object identifier with the key identifier during the processing of the key identifier.

11. A key management system of claim 9, wherein the instructions further cause the processor to
receive, by the storing engine, a passphrase identifier; and
process the passphrase identifier using the mapping to associate a passphrase with the storage object and the key.

12. A key management system of claim 9, wherein the instructions further cause the processor to, by the retrieving engine, determine that the ASM is operative to store the mapping prior to storing the mapping in the first memory of the storage server.

13. A key management system of claim 9, wherein the security operation comprises a shredding operation.

14. A key management system of claim 9, wherein the security operation comprises generating a new key for the storage object.

15. A key management system of claim 9, wherein the security operation comprises performing a crypto shred by:
retrieving the storage object;
decrypting the storage object, using the key identified by the key identifier, to yield a plaintext storage object;
encrypting the plaintext storage object using a new key identified by a new key identifier;
storing the new key using the first memory of the storage server; and
updating the second memory of the ASM to reflect a new mapping between the storage object and the new key.

16. A storage server comprising:
a processor; and
a memory coupled to the processor and configurable for storing instructions, which, when executed by the processor cause the processor to:
  generate, by an encryption engine, key information for a storage object stored in a memory of the storage server, the key information to be stored in an encryption engine memory of the storage server and comprising a key and a key identifier of the key;
  process, by a key management module (KMM), the key identifier with an object identifier of the storage object to result in a mapping between the key and storage object;
  store the mapping in a second memory of an authenticated storage module (ASM) to result in the mapping being stored in a dedicated storage location, wherein the ASM is to be implemented by a portable storage device comprising a second processor and the second memory, wherein the ASM is operable to be coupled to the storage server, wherein the memory of the ASM does not store the key, and wherein the memory of the storage server stores the key but not the mapping;
  receive, by the KMM, a request to perform a security option;
  determine, by the KMM, a connected state of the ASM, wherein the connected state indicates whether the ASM is physically connected to the storage server; and
  invoke a security operation on the storage object based on the determined connected state of the ASM and whether the ASM has authenticated identities of both the storage server and an administrator of the storage server, wherein the processor, to invoke the security operation, is to at least,
    retrieve the mapping from the ASM,
    determine the key associated with the storage object based on the key identifier in the mapping, and
    perform the security operation on data of the storage object using the key.

17. A storage server of claim 16, wherein the instructions further cause the processor to:
  receive, by the KMM, the object identifier during an initialization of the storage object; and
  associate the object identifier with the key identifier during the processing of the key identifier by the KMM.

18. A storage server of claim 16, wherein the instructions further cause the processor to:
  receive, by the KMM, a passphrase identifier; and
  process the passphrase identifier for associating a passphrase with the storage object and the key.

19. A storage server of claim 16, wherein the security operation comprises a shredding operation.

20. A storage server of claim 16, wherein the security operation comprises generating a new key for the storage object.

21. A storage server of claim 16, wherein the security operation comprises performing a crypto shred by:
  retrieving the storage object;
  decrypting the storage object, using the key identified by the key identifier, to yield a plaintext storage object;
  encrypting the plaintext storage object using a new key identified by a new key identifier;
  storing the new key using the encryption engine memory of the storage server; and
  updating the memory of the ASM to reflect a new mapping between the storage object and the new key.

* * * * *